United States Patent
Carames et al.

(10) Patent No.: US 8,897,771 B1
(45) Date of Patent: Nov. 25, 2014

(54) ROAMING POLICY AWARE DEVICE CAPABILITIES

(71) Applicant: Cellco Partnership, Basking Ridge, NJ (US)

(72) Inventors: Miguel A. Carames, Martinez, CA (US); Amol Tuli, Dublin, CA (US); Maria E. Palamara, Denville, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 15 days.

(21) Appl. No.: 13/897,901

(22) Filed: May 20, 2013

(51) Int. Cl.
*H04W 4/00* (2009.01)
*H04W 8/02* (2009.01)
*H04W 48/18* (2009.01)

(52) U.S. Cl.
CPC ............... *H04W 8/02* (2013.01); *H04W 48/18* (2013.01)
USPC ...................................... 455/432.1

(58) Field of Classification Search
USPC ....................................... 455/432.1
See application file for complete search history.

(56) References Cited

U.S. PATENT DOCUMENTS

| 7,869,803 B2 * | 1/2011 | Corson et al. ............... 455/433 |
| 2008/0160958 A1 * | 7/2008 | Abichandani et al. ........ 455/410 |
| 2013/0007853 A1 * | 1/2013 | Gupta et al. ..................... 726/5 |

* cited by examiner

*Primary Examiner* — Joel Ajayi

(57) ABSTRACT

A user device may receive roaming policy information. The roaming policy information may identify a roaming network and one or more services available to the user device via the roaming network. The user device may determine that the user device is to connect to the roaming network. The user device may determine a service, of the one or more services, to be provided to the user device via the roaming network. The determination may be based on the roaming policy information. The user device may provide, to a network device associated with the roaming network, information identifying the service to be provided via the roaming network, based on determining that the user device is to connect to the roaming network.

20 Claims, 8 Drawing Sheets

| Network Identifier 510 | MCC-MNC 520 | Network Technology 530 | Network Attribute 540 | Services 550 |
|---|---|---|---|---|
| Telecom Germany | 262-17 | eUTRAN | Rel10 IPv6 | Home Routed RCS, CSFB |
| Telecom Canada | 302-230 | UTRAN GERAN | Rel99 IPv4 | CS, PS |
| Telecom Norway | 242-10 | UTRAN GERAN | Rel10 IPv6 | Home Routed RCS |

ROAMING POLICY AWARE DEVICE CAPABILITIES

BACKGROUND

A user device may connect to a roaming network when the user device is unable to connect to a home network associated with the user device (e.g., when the user device is outside of a geographical coverage area of the home network). The roaming network may determine which services are supported based on the capabilities of the roaming network and/or based on a roaming agreement between the roaming network and a home network, and may provide the supported services to the user device.

BRIEF DESCRIPTION OF THE DRAWINGS

FIG. 5 is a diagram of an example data structure that stores roaming policy information associated with a roaming network;

DETAILED DESCRIPTION

The following detailed description of example implementations refers to the accompanying drawings. The same reference numbers in different drawings may identify the same or similar elements.

A home network may have a roaming policy in place, associated with a roaming network, that may allow a user device, associated with the home network, to receive a service when the user device is connected to the roaming network. However, the user device may not be aware of roaming policy information associated with the services to be provided in accordance with the roaming policy (e.g., an inter-operator roaming agreement, etc.). As such, the user device may request services that are not included in the roaming policy and/or may request services that the roaming network is incapable of providing. This may result in a failed connection and/or a trial and error process to determine the services that the roaming network may provide to the user device. Implementations described herein may assist a user device in quickly and reliably connecting to a roaming network by providing information associated with a roaming policy to the user device so the user device may request the appropriate services from the roaming network. In this way, the attachment time and the success rate of the user device's connection to the roaming network may be improved.

Figure 1:
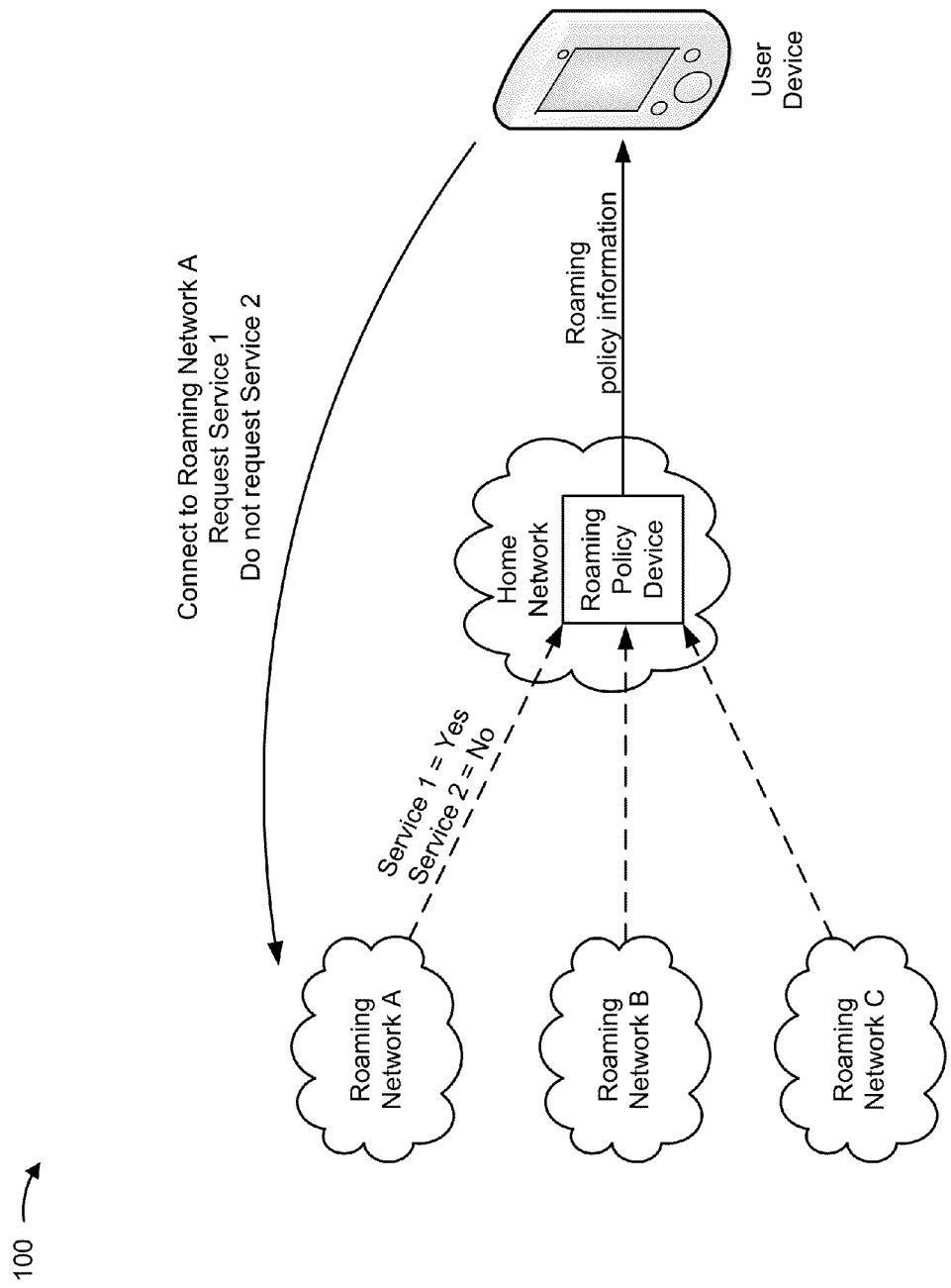
FIG. 1 is a diagram of an overview of an example implementation described herein.

FIG. 1 is a diagram of an overview of an example implementation 100 described herein. As shown in FIG. 1, assume that a home network has three roaming policies in place associated with three different roaming networks, identified as roaming network A, roaming network B, and roaming network C. As shown, information associated with the three roaming policies may be stored by a roaming policy device within the home network. For example, roaming policy information associated with roaming network A may indicate that a user device, associated with the home network, can receive service 1 when connected to roaming network A, as shown. Additionally, the roaming policy information associated with roaming network A may indicate that the user device cannot receive service 2 when connected to roaming network A. As further shown in FIG. 1, the roaming policy device may transmit the roaming policy information to the user device, and the user device may store the roaming policy information.

As further shown in FIG. 1, the user device may attempt to connect to roaming network A. The user device may request services in accordance with the roaming policy when establishing the connection to roaming network A, as shown. For example, the user device may determine that roaming network A can provide service 1, and the user device may determine that roaming network A cannot provide service 2, as shown. This determination may be based on the roaming policy information, associated with roaming network A, stored on the user device. The user device may request the services from roaming network A. The request may indicate that roaming network A is to provide service 1 to the user device, and may indicate that roaming network A is not to provide service 2 to the user device. In this way, a user device may request only those services included in a roaming policy when connected to a roaming network.

Figure 2:
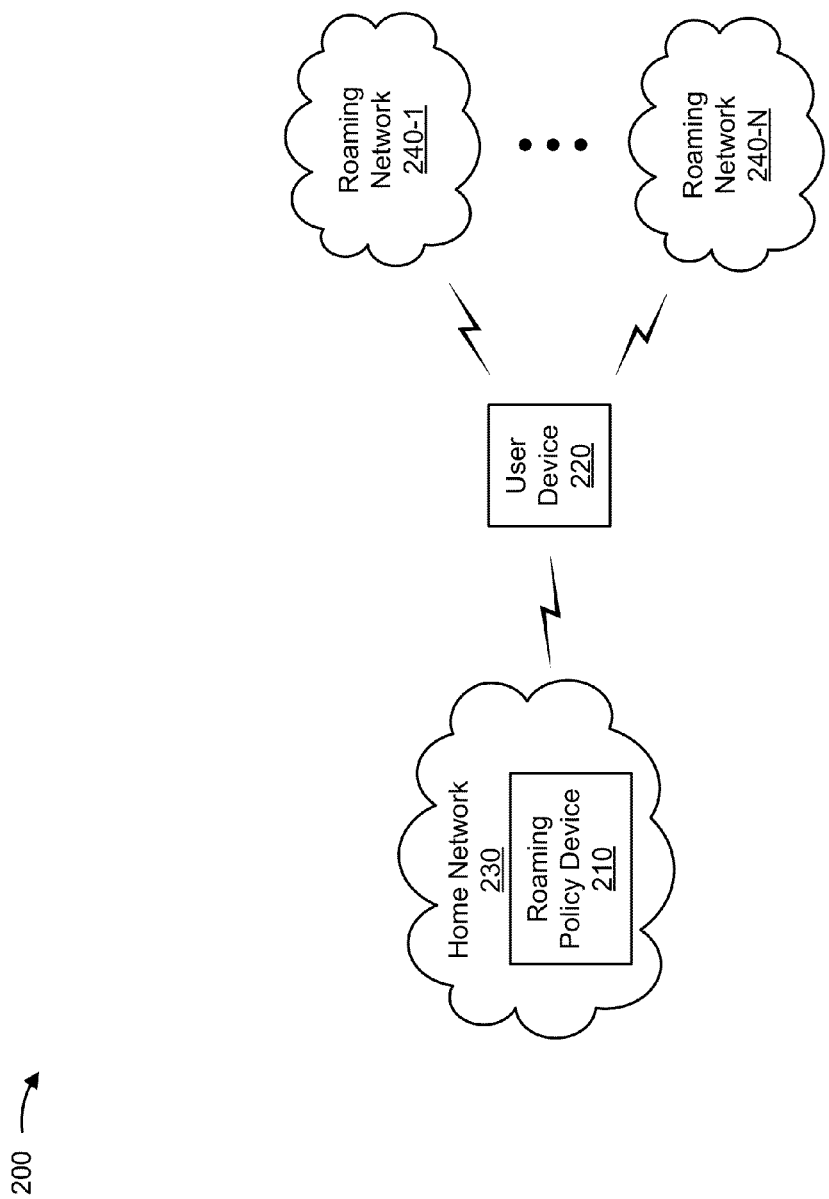
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a roaming policy device 210, a user device 220, a home network 230, and a set of roaming networks 240-1 through 240-N (N≥1) (hereinafter collectively referred to as "roaming networks 240," and individually as "roaming network 240").

Roaming policy device 210 may include a device capable of receiving, generating, processing, storing, and/or providing information associated with a roaming policy. For example, roaming policy device 210 may include a server or a collection of servers. Roaming policy device 210 may receive, store, and/or provide information that identifies a service that may be provided to user device 220 when user device 220 is connected to roaming network 240 (e.g., that user device 220 is permitted to obtain from roaming network 240). In some implementations, roaming policy device 210 may provide the roaming policy information to user device 220 when user device 220 is connected to home network 230.

User device 220 may include a device capable of communicating with home network 230 and/or roaming network 240. For example, user device 220 may include a wireless communication device, a radiotelephone, a personal communications system ("PCS") terminal (e.g., that may combine a cellular radiotelephone with data processing and data communications capabilities), a personal digital assistant ("PDA") (e.g., that can include a radiotelephone, a pager, Internet/intranet access, etc.), a smart phone, a laptop computer, a tablet computer, a personal gaming system, and/or a similar device. In some implementations, user device 220 may receive roaming policy information from roaming policy device 210, and may store the roaming policy information in a data structure associated with user device 220 (e.g., on a universal integrated circuit card ("UICC"), in a random access memory ("RAM"), on a hard disk, etc.). User device 220 may use the roaming policy information when accessing roaming network 240.

Home network 230 may include one or more wired and/or wireless networks that include an entry for user device 220 in a subscriber register associated with home network 230. Home network 230 may include a cellular network, a public land mobile network ("PLMN"), a second generation ("2G") network, a third generation ("3G") network, a fourth generation ("4G") network, a fifth generation ("5G") network, a long-term evolution ("LTE") network, and/or another network. Additionally, or alternatively, home network 230 may include a local area network ("LAN"), a wide area network ("WAN"), a metropolitan area network ("MAN"), a WiFi network, a telephone network (e.g., the Public Switched Telephone Network ("PSTN")), an ad hoc network, an intranet, the Internet, a fiber optic-based network, and/or a combination of these or other types of networks.

Roaming network 240 may include one or more wired and/or wireless networks that do not include an entry for user device 220 in a subscriber register associated with roaming network 240. Additionally, or alternatively, roaming network 240 may include one or more wired and/or wireless networks that are outside of a geographical coverage area of home network 230 associated with user device 220. For example, roaming network 240 may include a cellular network, a PLMN, a 2G network, a 3G network, a 4G network, a 5G network, an LTE network, and/or another network. Additionally, or alternatively, roaming network 240 may include a LAN, a WAN, a MAN, a WiFi network, a telephone network, an ad hoc network, an intranet, the Internet, a fiber optic-based network, and/or a combination of these or other types of networks. In some implementations, roaming network 240 may be associated with a roaming policy. The roaming policy may describe services that user device 220 is permitted to obtain from roaming network 240 when user device 220 is connected to roaming network 240.

The number of devices and/or networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more of the devices shown in FIG. 2 may be implemented within a single device, or a single device shown in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
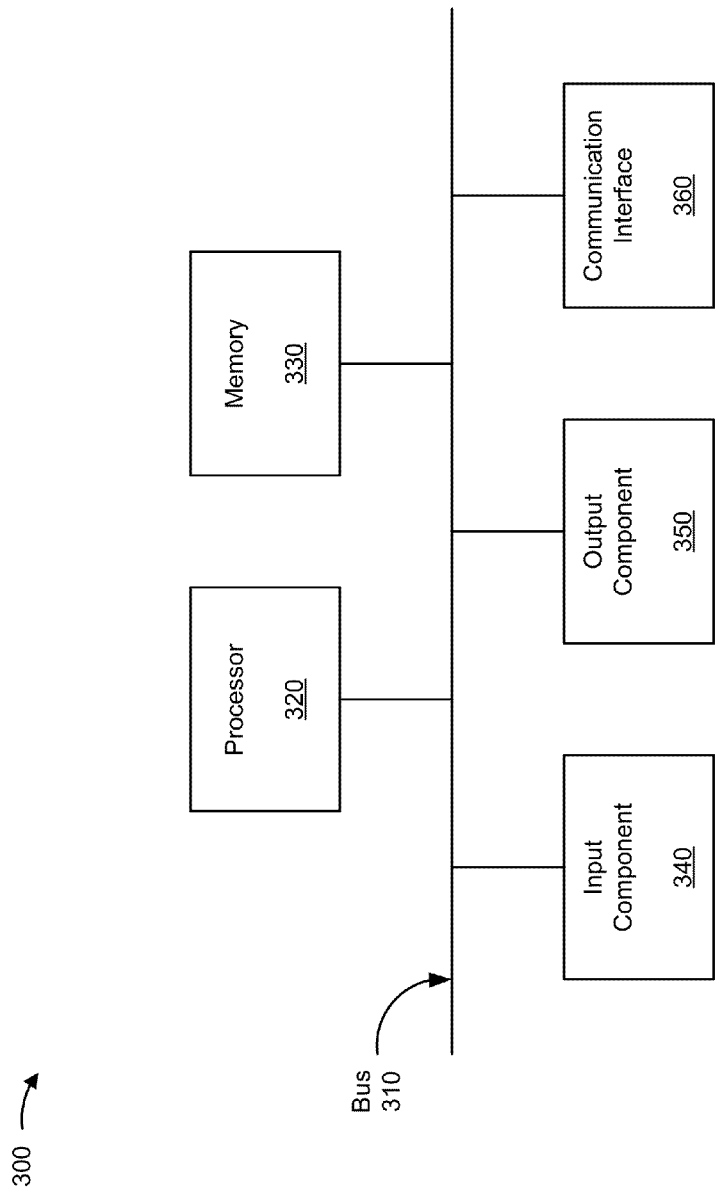
FIG. 3 is a diagram of example components of one or more devices of FIG. 2.

FIG. 3 is a diagram of example components of a device 300. Device 300 may correspond to roaming policy device 210 and/or user device 220. Additionally, or alternatively, each of roaming policy device 210 and/or user device 220 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor, a microprocessor, and/or any processing component (e.g., a field-programmable gate array ("FPGA"), an application-specific integrated circuit ("ASIC"), etc.) that interprets and/or executes instructions. In some implementations, processor 320 may include one or more processor cores. Memory 330 may include a RAM, a read only memory ("ROM"), a UICC, and/or any type of dynamic or static storage device (e.g., a flash memory, a magnetic memory, an optical memory, etc.) that stores information and/or instructions for use by processor 320.

Input component 340 may include any component that permits a user to input information to device 300 (e.g., a keyboard, a keypad, a mouse, a button, a switch, etc.). Output component 350 may include any component that outputs information from device 300 (e.g., a display, a speaker, one or more light-emitting diodes ("LEDs"), etc.).

Communication interface 360 may include any transceiver-like component, such as a transceiver and/or a separate receiver and transmitter, that enables device 300 to communicate with other devices and/or systems, such as via a wired connection, a wireless connection, or a combination of wired and wireless connections. For example, communication interface 360 may include a component for communicating with another device and/or system via a network. Additionally, or alternatively, communication interface 360 may include a logical component with input and output ports, input and output systems, and/or other input and output components that facilitate the transmission of data to and/or from another device, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes that are described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
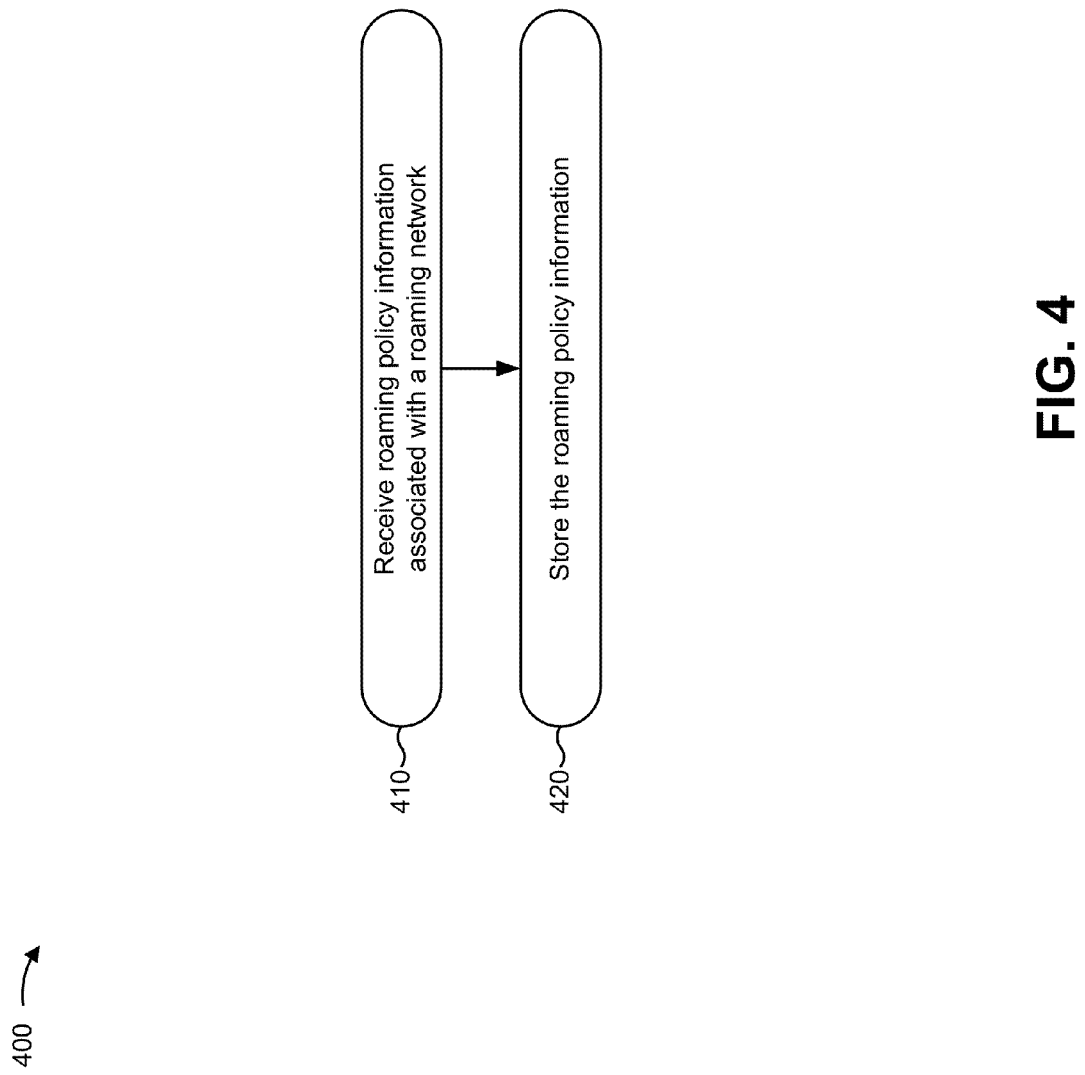
FIG. 4 is a flow chart of an example process for receiving and storing roaming policy information associated with a roaming network.

FIG. 4 is a flow chart of an example process 400 for receiving and storing roaming policy information associated with a roaming network. In some implementations, one or more process blocks of FIG. 4 may be performed by user device 220. In some implementations, one or more process blocks of FIG. 4 may be performed by another device or a group of devices separate from or including user device 220, such as roaming policy device 210.

As shown in FIG. 4, process 400 may include receiving roaming policy information associated with a roaming network (block 410). For example, user device 220 may receive roaming policy information associated with one or more roaming networks 240. In some implementations, user device 220 may receive the roaming policy information from roaming policy device 210.

In some implementations, user device 220 may receive the roaming policy information when user device 220 connects to home network 230 (e.g., when user device 220 is turned on, when user device 220 establishes a connection to home network 230, etc.). Additionally, or alternatively, user device 220 may receive the roaming policy information during the initial programming and/or configuration of user device 220 (e.g., before user device 220 connects to home network 230 for the first time, etc.). Additionally, or alternatively, user device 220 may receive an updated version of the roaming policy information when user device 220 establishes a connection to home network 230 (e.g., when the roaming policy information has been modified since the last time user device 220 was connected to home network 230). Additionally, or alternatively, user device 220 may periodically receive the roaming policy information from home network 230 at a particular interval of time (e.g., every 7 days, etc.).

Roaming policy information, as used herein, may include information associated with a service that user device 220, associated with home network 230, may obtain from roaming network 240 when user device 220 is connected to roaming network 240. In some implementations, the roaming policy information may include information associated with a roaming agreement between home network 230 and roaming network 240. For example, a roaming agreement may describe billing of services used by user device 220, associated with home network 230, while user device 220 is connected to roaming network 240. Additionally, or alternatively, the roaming policy information may be based on information associated with a capability of roaming network 240. For example, the roaming policy information may include information that identifies a network technology, a network attribute, and/or a service capable of being provided by roaming network 240.

The roaming policy information may also include information identifying roaming network 240 (e.g., a network name, a mobile country code ("MCC"), a mobile network code ("MNC"), etc.), a network technology associated with roaming network 240 (e.g., a network type of roaming network 240, etc.), a network attribute of roaming network 240 (e.g. a set of standards associated with roaming network 240, a communications protocol associated with roaming network 240, etc.), and/or a service included in the roaming policy (e.g., a service that can be provided by roaming network 240, a service to be routed by roaming network 240 to home network 230, etc.).

A network technology, as used herein, may include a type of access network that may allow user device 220 to connect to a core network. For example, a network technology may include a radio access network (e.g., a global system for mobile communications ("GSM") network, a universal mobile telecommunications system ("UMTS") network, a high speed packet access network, a WiFi network, an evolved high rate packet data network, a GSM enhanced data rates for GSM evolution radio access network ("GERAN"), a universal terrestrial radio access network ("UTRAN"), an evolved universal terrestrial radio access network ("eUTRAN"), etc.). In some implementations, a network (e.g., home network 230, roaming network 240, etc.) may support a connection to a core network using one or more types of network technologies. For example, roaming network 240 may support a connection to a core network, associated with roaming network 240, using both GERAN and UTRAN network technologies.

A network attribute, as used herein, may include information indicating a characteristic of roaming network 240 that may be associated with a service that can be provided to user device 220 when user device 220 is connected to roaming network 240. For example, a network attribute may include information indicating that roaming network 240 supports a set of standards (e.g., $3^{rd}$ Generation Partnership program ("3GPP") release 10 support, 3GPP Release 99 support, etc.) a communications protocol (e.g., internet protocol ("IP") version 6 support, IP version 4 support, etc.), a maximum transmission unit size (e.g., 68 bytes, at least 1280 bytes, etc.), a protocol configuration option (e.g., an encryption configuration, etc.) or the like.

A service, as used herein, may include a function that may be provided to user device 220 by roaming network 240, pursuant to a roaming policy, when user device 220 is connected to roaming network 240. For example, a service may include a function to be provided to user device 220 by roaming network 240 (e.g., a circuit switching ("CS") service, a packet switching ("PS") service, a circuit switched fallback ("CSFB") service, a rich communications suite ("RCS") service, a local break-out VoLTE service, a voice over high speed packet access ("VoHSPA") service, an IP multimedia subsystem ("IMS") service, etc.) and/or a function that is to be provided by 230 home network via roaming network 240 (e.g., a home routed VoLTE service, a home routed RCS service, an IP version 6 based access point name service, another service provided using a home network access point name connection, etc.).

In some implementations, a network technology of roaming network 240 may dictate whether a service may (or may not) be provided by roaming network 240 (e.g., a limitation of a network technology of roaming network 240 may dictate whether a service may be provided). For example, a roaming network 240 that supports a particular network technology may allow a particular service to be provided to user device 220 (e.g., a voice over long term evolution ("VoLTE") service may be provided by a network that supports eUTRAN technology). Alternatively, a roaming network 240 that supports a different network technology may not allow the particular service to be provided by roaming network 240 (e.g., a VoLTE service may not be provided by a network that supports only GERAN technology).

In some implementations, a network attribute of roaming network 240 may dictate whether a service may (or may not) be provided (e.g., a limitation of a network attribute of roaming network 240 may dictate whether a service may be provided). For example, a roaming network 240 that supports a particular set of standards (e.g., 3GPP Release 10) and/or a particular communications protocol (e.g., IP version 6) may allow a particular service to be provided to user device 220 (e.g., a home routed service using an IMS access point name connection may be provided by roaming network 240). Alternatively, a roaming network 240 that supports a different set of standards (e.g., 3GPP Release 99) and a different communications protocol (e.g., IP version 4) may not allow the particular service to be provided to user device 220 (e.g., a home routed service using an IMS access point name connection may not be provided by roaming network 240).

As further shown in FIG. 4, process 400 may include storing the roaming policy information (block 420). For example, user device 220 may store the roaming policy information in a data structure. In some implementations, user device 220 may store information associated with the roaming policy information, such as a roaming network identifier (e.g., a name of roaming network 240, an MCC and/or an MNC associated with roaming network 240, etc.) that identifies roaming network 240 associated with the roaming policy information. Additionally, or alternatively, user device may store roaming policy information associated with a network technology of roaming network 240, a network attribute of roaming network 240, and/or a service to be provided by roaming network 240. In some implementations, user device 220 may store the roaming policy information in a memory location associated with user device 220 (e.g., a UICC, a RAM, a hard disk, etc.).

While a series of blocks has been described with regard to FIG. 4, the blocks and/or the order of the blocks may be modified in some implementations. Additionally, or alternatively, non-dependent blocks may be performed in parallel. Further, one or more blocks may be omitted.

FIG. 5 is a diagram of an example data structure 500 that stores roaming policy information associated with a roaming network. Data structure 500 may be stored in a memory device (e.g., a UICC, a RAM, a hard disk, etc.) associated with one or more devices and/or components of FIGS. 2 and/or 3. For example, data structure 500 may be stored by user device 220 and/or roaming policy device 210.

Data structure 500 may include a collection of fields, such as a network identifier field 510, an MCC-MNC field 520, a network technology field 530, a network attribute field 540, and a services field 550.

Network identifier field 510 may store information that identifies a roaming network 240 associated with roaming policy information stored in data structure 500. For example, the network name may include a name of roaming network 240 (e.g., Telecom Germany) or any other string of characters that uniquely identifies roaming network 240.

MCC-MNC field 520 may store information that identifies an MCC and/or an MNC associated with roaming network 240 identified in network identifier field 510. For example, the MCC-MNC may include a string of characters (e.g., 262-17) that identifies the MCC and the MNC of roaming network 240 (e.g., Telecom Germany).

Network technology field 530 may store information that identifies a network technology associated with roaming network 240 identified in network identifier field 510. For example, roaming network 240, identified by network identifier field 510 and/or MCC-MNC field 520, may support a network technology (e.g., eUTRAN, etc.), in accordance with a roaming policy, when providing services to user device 220 connected to roaming network 240.

Network attribute field 540 may store information that identifies a network attribute associated with roaming network 240 identified in network identifier field 510. For example, roaming network 240, identified by network identifier field 510 and/or MCC-MNC field 520, may have a network attribute (e.g., 3GPP Release 10 support, IP version 6 support, etc.) that may be associated with services to be provided in accordance with a roaming policy.

Services field 550 may store information that identifies a service associated with roaming network 240 identified in network identifier field 510. For example, roaming network 240, identified by network identifier field 510 and/or MCC-MNC field 520, may provide a service (e.g., CSFB, Home Routed RCS, etc.) in accordance with a roaming policy to user device 220 connected to roaming network 240. In some implementations, the network technology, identified in network technology field 530, and/or the network attribute, identified in network attribute field 540, may dictate whether the service, identified in services field 550, is provided to user device 220, as discussed.

Information associated with a roaming policy may be conceptually represented as a single row in data structure 500. For example, the first row in data structure 500 may correspond to a roaming policy associated with a roaming network 240 named Telecom Germany. As shown, Telecom Germany may be identified by an MCC-MNC of 262-17. As further shown in the first row of data structure 500, the roaming policy may indicate that the Telecom Germany network supports eUTRAN technology for a connection with user device 220, and may indicate that the Telecom Germany network supports 3GPP Release 10 standards and IP version 6 communications protocol. As further shown, the Telecom Germany network offers CSFB and Home Routed RCS services to user device 220.

Data structure 500 includes fields 510-550 for explanatory purposes. In practice, data structure 500 may include additional fields, fewer fields, different fields, or differently arranged fields than those shown in FIG. 5 and/or described herein with respect to data structure 500. Furthermore, while data structure 500 is represented as a table with rows and columns, in practice, data structure 500 may include any type of data structure, such as a linked list, a tree, a hash table, a database, or any other type of data structure. In some implementations, data structure 500 may include information generated by a device and/or a component. Additionally, or alternatively, data structure 500 may include information provided from another source, such as information provided by a user and/or information automatically provided by a device.

Figure 6:
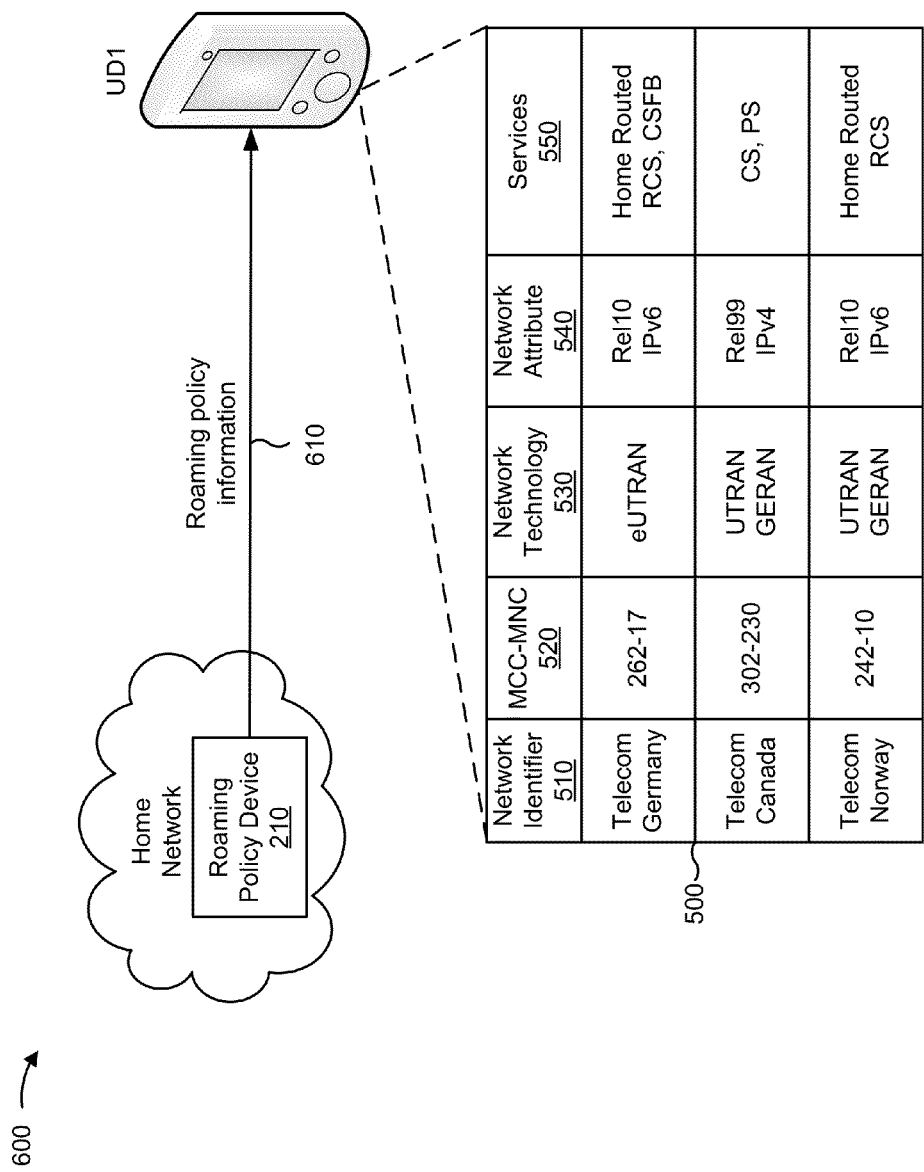
FIG. 6 is a diagram of an example implementation relating to the example process shown in FIG. 4.

FIG. 6 is a diagram of an example implementation 600 relating to example process 400 shown in FIG. 4. For the purposes of example implementation 600, assume that a Home Network has in place three different roaming policies associated with three different roaming networks, identified as Telecom Germany, Telecom Canada, and Telecom Norway. Further, assume that user device UD1 is connected to the Home Network associated with user device UD1. In example implementation 600, user device UD1 may receive roaming policy information associated with the three roaming networks from roaming policy device 210, and may store the roaming policy information in the form of data structure 500.

As shown by reference number 610, user device UD1 may receive, from roaming policy device 210, roaming policy information associated with the Telecom Germany roaming network, the Telecom Canada roaming network, and the Telecom Norway roaming network. The Telecom Germany network, the Telecom Canada network, and the Telecom Norway network may correspond to roaming networks 240. As further shown in FIG. 6, user device UD1 may store the roaming policy information associated with each of the three roaming networks in data structure 500.

For example, the roaming policy information may indicate that the roaming policy associated with the Telecom Germany network includes support for a connection using eUTRAN technology, may indicate that the Telecom Germany network supports 3GPP Release 10 standards and IP version 6 communications protocol, and may indicate that that the Telecom Germany network offers circuit switched fallback and home routed rich communication suite services to user device UD1.

As an additional example, the roaming policy information may indicate that the roaming policy associated with the Telecom Canada network includes support for a connection using UTRAN and/or GERAN technologies, may indicate that the Telecom Canada network supports 3GPP Release 99 standards and IP version 4 communications protocol, and may indicate that the Telecom Canada network offers circuit switching and packet switching services to user device UD1.

As a final example, the roaming policy information may indicate that the roaming policy associated with the Telecom Norway network includes support for a connection using UTRAN and/or GERAN technologies, may indicate that the Telecom Norway network supports 3GPP Release 10 standards and IP version 6 communications protocol, and may indicate that the Telecom Norway network offers home routed rich communication suite service to user device UD1.

As further shown in FIG. 6, user device UD1 may store the roaming policy information associated with the three roaming networks to a memory location associated with user device 220 (e.g., a UICC) in the form of data structure 500.

As indicated above, FIG. 6 is provided merely as an example. Other examples are possible and may differ from what was described with regard to FIG. 6.

Figure 7:
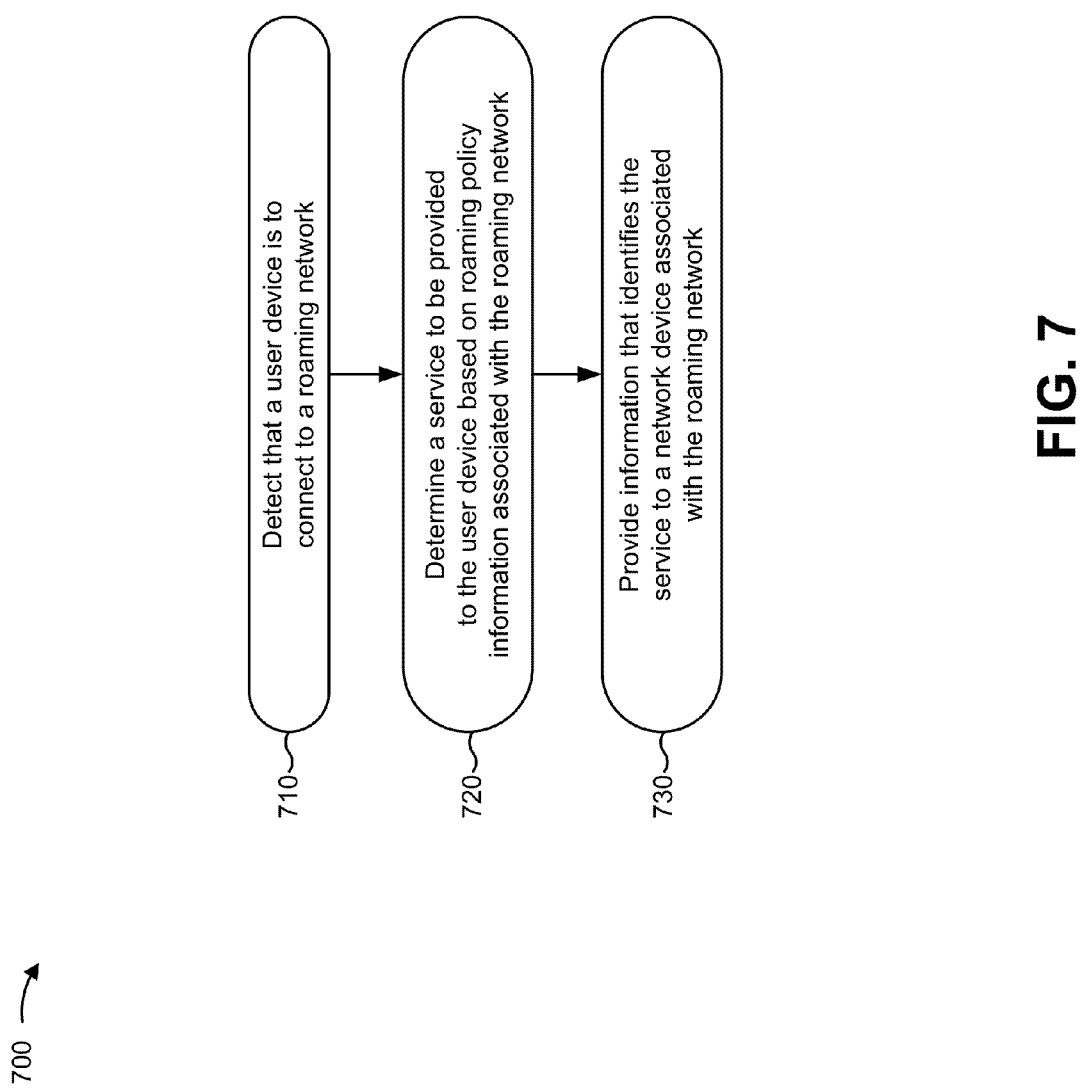
FIG. 7 is a flow chart of an example process for providing information that identifies a service to be provided to a user device by a roaming network.

FIG. 7 is a flow chart of an example process 700 for providing information that identifies a service to be provided to a user device by a roaming network. In some implementations, one or more process blocks of FIG. 7 may be performed by user device 220. In some implementations, one or more process blocks of FIG. 7 may be performed by another device or a group of devices separate from or including user device 220, such as roaming policy device 210.

As shown in FIG. 7, process 700 may include detecting that a user device is to connect to a roaming network (block 710). For example, user device 220 may detect that user device 220 is to connect to roaming network 240. In some implementations, user device 220 may detect that user device 220 is to connect to roaming network 240 based on information stored in a memory location of user device 220 (e.g., a UICC, a RAM, a hard disk, etc.). Additionally, or alternatively, user device 220 may detect that user device 220 is to connect to roaming network 240 based on a network selection process carried out by user device 220.

In some implementations, user device 220 may carry out a network selection process when user device 220 is not connected to a network (e.g., when user device 220 is turned on, when user device 220 loses a connection to a network, when user device 220 identifies a network to connect to, etc.). The network selection process may include user device 220 scanning cellular frequencies supported by user device 220 (e.g., 850 megahertz ("MHz"), 1900 MHz, etc.) to determine an available network that may support a connection. In some implementations, user device 220 may select an available network to establish a connection with based on a signal strength associated with the network.

Additionally, or alternatively, the network selection process may include retrieving information associated with the available network from a memory location (e.g., a UICC, etc.) associated with user device 220. The information associated with the available network may include information indicating an order or priority of attempting to connect to available networks (e.g., an order or priority based on a previous connection to the available network, an order or priority based on whether roaming policy information associated with the available network is stored on user device 220, etc.). User device 220 may select the available network to indicate that user device 220 will attempt a connection with the available network. The selection of the available network may be based on the order or priority associated with the available network. User device 220 may identify the selected available network using a network identifier (e.g., an MCC-MNC, etc.) associated with the selected available network.

For the purposes of FIG. 7, assume that a network selection process performed by user device 220 has resulted in user device 220 selecting roaming network 240 (e.g., roaming network 240 had the highest priority for connection of all of the available networks). User device 220 may detect that user device 220 is to connect to roaming network 240 based on user device 220 selecting roaming network 240 during the network selection process. In some implementations, user device 220 may detect that user device 220 is to connect to roaming network 240 based on a network identifier (e.g., a network name, an MCC-MNC, etc.) associated with the available network selected by user device 220 during the network selection process.

As further shown in FIG. 7, process 700 may include determining a service to be provided to the user device based on roaming policy information associated with the roaming network (block 720). For example, user device 220 may determine a service to be provided by roaming network 240 based on information stored in a data structure (e.g., data structure 500).

In some implementations, user device 220 may determine a service to be provided by roaming network 240 based on roaming policy information associated with roaming network 240. For example, the determination may be based on a service, associated with roaming network 240, identified in services field 550 of data structure 500. Additionally, or alternatively, the determination may be based on a network technology (e.g., identified in network technology field 530 of data structure 500) supported by roaming network 240. For example, user device 220 may determine that a service (e.g., VoLTE) may be provided based on a network technology (e.g., eUTRAN) supported by roaming network 240. Additionally or alternatively, the determination may be based on a network attribute (e.g., identified in network attribute field 540 of data structure 500) associated with roaming network 240. For example, user device 220 may determine that a service (e.g., home routed RCS using an IMS access point name connection) may be provided by roaming network 240 based on a network attribute associated with roaming network 240 (e.g., support for 3GPP Release 10 standards, and support for IP version 6 communications protocol).

As further shown in FIG. 7, process 700 may include providing information that identifies the service to a network device associated with the roaming network (block 730). For example, user device 220 may provide information that identifies the service to a network device associated with roaming network 240.

In some implementations, user device 220 may provide the information by sending a request, to a network device associated with roaming network 240, requesting the service. Roaming network 240 may determine whether the service is to be provided based on the capabilities of roaming network 240 and/or based on information received from home network 230.

In some implementations, roaming network 240 may determine whether the service is to be provided to user device 220 based on the capabilities of roaming network 240. If roaming network 240 is capable of providing the requested service, then roaming network 240 may process information from user device 220 associated with the service (e.g., a call request, a data request, etc.) accordingly. Based on the requested service, the capabilities of roaming network 240, and/or information received from home network 230, roaming network 240 may establish a connection with user device 220 and/or may provide the service to user device 220.

In some implementations, user device 220 may send the request for the service to a network device associated with roaming network 240, and the network device associated with roaming network 240 may provide information associated with the service to a network device associated with home network 230. For example, user device 220 may send a request for a service that is to be provided via a home routed service to a network device associated with roaming network 240. The request may indicate that user device 220 wishes to set up a session with home network 230 (e.g., via an access point name connection), and may indicate a network attribute of roaming network 240 associated with the request (e.g., a communications protocol that is required to be supported by roaming network 240, etc.). The network device may determine that roaming network 240 may support the session and may provide the information to a network device associated with home network 230. Based on the information received from roaming network 240, home network 230 may decide to support the home routed service (e.g., home routed VoLTE using access point name associated with home network 230) and may advise roaming network 240 accordingly.

In some implementations, roaming network 240 may handle a request (e.g., a call request, a data request, etc.) from user device 220 based on the service requested by user device 220. For example, roaming network 240 may handle a call request from user device 220 based on roaming network 240 providing a service associated with handling calls (e.g., a call service provided to user device 220 by roaming network 240, etc.). Additionally, or alternatively, roaming device 240 may handle a call request from user device 220 based on home network 230 providing a call service via roaming network 240 (e.g., a home routed call service provided to user device 220 via an access point name connection, etc.).

While a series of blocks has been described with regard to FIG. 7, the blocks and/or the order of the blocks may be modified in some implementations. Additionally, or alternatively, non-dependent blocks may be performed in parallel. Further, one or more blocks may be omitted.

Figure 8:
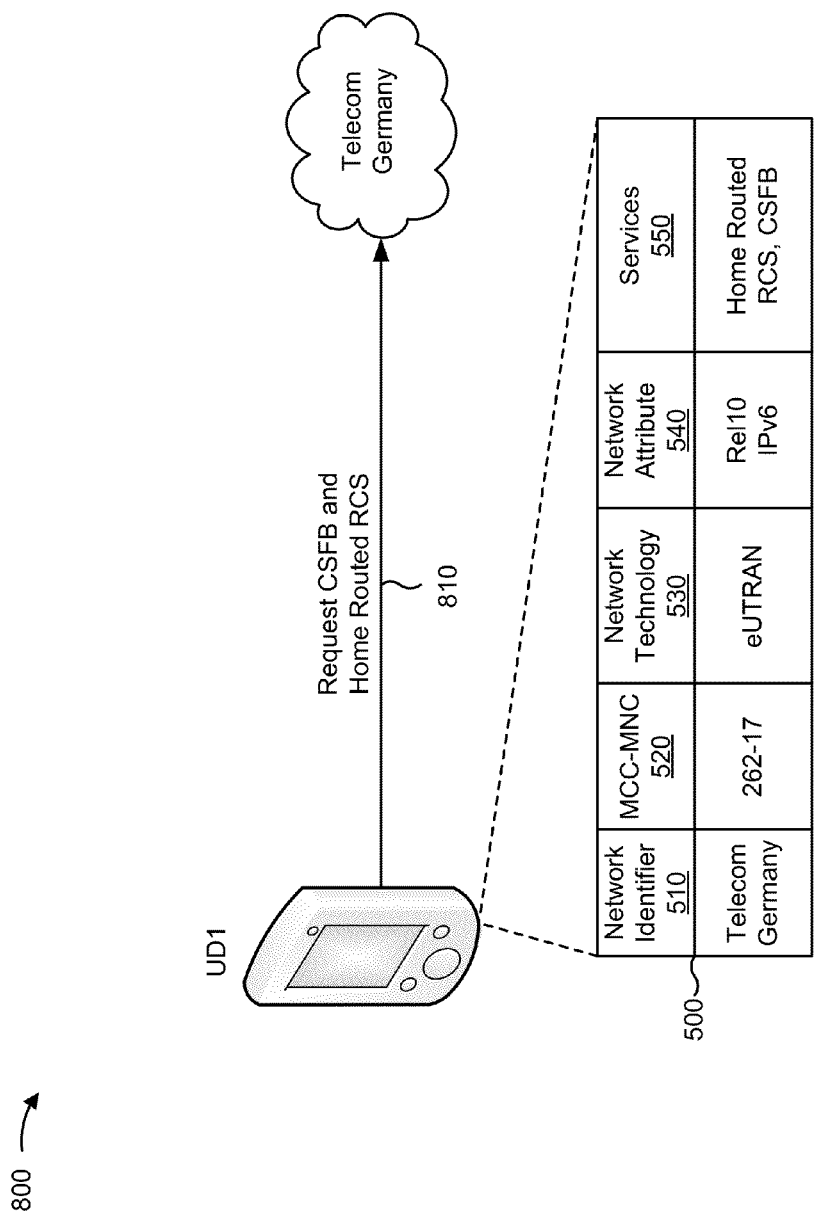
FIG. 8 is a diagram of an example implementation relating to the example process shown in FIG. 7.

FIG. 8 is a diagram of an example implementation 800 relating to example process 700 shown in FIG. 7. In example implementation 800, user device UD1 may determine a service that is to be requested from a roaming network, and user device UD1 may provide information that identifies the service to a network device associated with the roaming network. For the purposes of example implementation 800, assume that user device UD1 is not connected to a network and is to select a network using a network selection process.

As shown in FIG. 8, user device UD1 may detect that user device UD1 is to connect to a roaming network, Telecom Germany. The detection may be based on a network selection process performed by user device UD1. The selection of the Telecom Germany network may be based on information (e.g., an indication of a previous connection to the Telecom Germany network, an indication that user device UD1 stores roaming policy information associated with the Telecom Germany network) stored in a memory location (e.g., a UICC) associated with user device UD1. As shown, user device UD1 has detected that user device UD1 is to connect to the Telecom Germany network based on the Telecom Germany network being selected using the network selection process.

As further shown in FIG. 8, user device UD1 may determine a service to be provided to user device UD1 by the Telecom Germany network. The determination may be based on roaming policy information, stored by user device UD1, associated with the Telecom Germany network. For example, user device UD1 may determine the service to be provided to user device UD1 by the Telecom Germany network based on roaming policy information stored on a UICC of user device UD1 in the form of data structure 500. As shown, the roaming policy information associated with the Telecom Germany network indicates that both home routed rich communications suite service and circuit switched fallback service can be provided to user device UD1 by the Telecom Germany network. Additionally, the roaming policy information may indicate that the Telecom Germany network supports a connection using eUTRAN technology, and may indicate that the Telecom Germany network supports 3GGP Release 10 standards and IP version 6 communications protocol.

As shown by reference number 810, user device UD1 may send a request to a network device associated with the Telecom Germany network to indicate that both Home Routed RCS service and CSFB service are to be provided to user device UD1. For the purposes of example implementation 800, assume that the roaming policy information associated with the Telecom Germany network is based on a roaming agreement between a home network of user device UD1 and the Telecom Germany network. Further, assume that the roaming policy information correctly reflects the capabilities of the Telecom Germany network.

The Telecom Germany network may determine that both the home routed RCS service and the CSFB service may be provided to user device UD1, and may permit a connection with user device UD1 to provide the requested services to user device UD1. The Telecom Germany network may handle a voice request (e.g., by providing CSFB service) made by user device UD1. Additionally, the Telecom Germany network may provide an access point name connection to handle a data request (e.g., by allowing an IMS access point name connection for home routed RCS) from user device UD1.

As indicated above, FIG. 8 is provided merely as an example. Other examples are possible and may differ from what was described with regard to FIG. 8.

Implementations described herein may allow a user device to incorporate information associated with a roaming policy when requesting services to be provided by a roaming network. As a result, the user device may request only those services included in a roaming policy, which may allow for an optimal connection with the roaming network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, as described herein, may be implemented in many different forms of software, firmware, and hardware in the implementations shown in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A user device, comprising:
one or more processors to:
receive roaming policy information,
the roaming policy information including:
first information regarding a first policy for a first roaming network, and
second information regarding a second policy for a second roaming network;
store, based on the first information regarding the first policy and in a first network identifier field of a data structure, a first network identifier that identifies the first roaming network;
store, based on the first information regarding the first policy and in a first network technology field of the data structure, information identifying one or more first network technologies supported by the first roaming network;
store, based on the first information regarding the first policy and in a first service field of the data structure, information identifying one or more first services available to the user device via the first roaming network;
store, based on the second information regarding the second policy and in a second network identifier field of the data structure, a second network identifier that identifies the second roaming network;
store, based on the second information regarding the second policy and in a second network technology field of the data structure, information identifying one or more second network technologies supported by the second roaming network;
store, based on the second information regarding the second policy and in a second service field of the data structure, information identifying one or more second services available to the user device via the second roaming network;
determine that the user device is to connect to the first roaming network;
determine a service, of the one or more first services, to be provided to the user device via the first roaming network based on a network technology of the one or more first network technologies; and
provide, to a network device associated with the first roaming network, information identifying the service to be provided via the first roaming network, based on determining that the user device is to connect to the first roaming network.

2. The user device of claim 1, where the one or more processors, when receiving the roaming policy information, are to:
receive the roaming policy information via a home network associated with the user device.

3. The user device of claim 1, where the one or more processors are further to:
store, based on the first information regarding the first policy and in the data structure, a network attribute associated with the first roaming network.

4. The user device of claim 1,
where the one or more one or more processors are further to:
determine information associated with a roaming agreement,
the roaming agreement being an agreement associated with the first roaming network and a home network associated with the user device; and
where the one or more processors, when receiving the roaming policy information, are further to:
receive the roaming policy information based on determining the information associated with the roaming agreement.

5. The user device of claim 1,
where the one or more processors are further to:
perform a network selection process based on the roaming policy information; and
where the one or more processors, when determining that the user device is to connect to the first roaming network, are further to:
determine that the user device is to connect to the first roaming network based on the network selection process.

6. The user device of claim 1,
where the one or more processors, when determining the service, are further to:
determine a network attribute associated with the first roaming network; and
determine the service based on the network attribute and the network technology.

7. The user device of claim 1, where the one or more processors, when providing the information identifying the service, are further to:
determine a home network service to be provided by a home network via the first roaming network; and
provide information identifying the home network service based on determining the home network service to be provided by the home network via the first roaming network.

8. A non-transitory computer-readable medium storing instructions, the instructions comprising:
one or more instructions that, when executed by a processor of a user device, cause the processor to:
receive roaming policy information including:
first information regarding a first policy for a first roaming network, and
second information regarding a second policy for a second roaming network;
store, based on the first information regarding the first policy and in a first network identifier field of a data structure, a first network identifier that identifies the first roaming network;
store, based on the first information regarding the first policy and in a first network attribute field of the data structure, information identifying one or more first network attributes associated with the first roaming network;
store, based on the first information regarding the first policy and in a first service field of the data structure, information identifying one or more first services available to the user device via the first roaming network;
store, based on the second information regarding the second policy and in a second network identifier field of the data structure, a second network identifier that identifies the second roaming network;
store, based on the second information regarding the second policy and in a second network attribute field of the data structure, information identifying one or more second network attributes associated with the second roaming network;
store, based on the second information regarding the second policy and in a second service field of the data structure, information identifying one or more second services available to the user device via the second roaming network;

determine that the user device is to establish a connection with the first roaming network;

generate a request for a service, of the one or more first services, to be provided to the user device via the first roaming network; and send, to a network device associated with the first roaming network, the request for the service to be provided to the user device via the first roaming network based on detecting that the user device is to establish the connection with the first roaming network.

9. The non-transitory computer-readable medium of claim 8, where the one or more instructions to receive the roaming policy information comprise:

one or more instructions that, when executed by the processor, cause the processor to:
receive the roaming policy information via a home network associated with the user device.

10. The non-transitory computer-readable medium of claim 8, where the roaming policy information further identifies a network technology associated with the first roaming network.

11. The non-transitory computer-readable medium of claim 8, where the instructions further comprise:
one or more instructions that, when executed by the processor, cause the processor to:
determine information associated with a roaming agreement,
the roaming agreement being an agreement associated with the first roaming network and a home network associated with the user device; and
where the one or more instructions to receive the roaming policy information comprise:
one or more instructions that, when executed by the processor, further cause the processor to:
receive the roaming policy information based on determining the information associated with the roaming agreement.

12. The non-transitory computer-readable medium of claim 8, where the instructions further comprise:
one or more instructions that, when executed by the processor, cause the processor to:
perform a network selection process; and
where the one or more instructions to determine that the user device is to establish the connection with the first roaming network comprise:
one or more instructions that, when executed by the processor, cause the processor to:
determine that the user device is to establish the connection with the first roaming network based on the network selection process.

13. The non-transitory computer-readable medium of claim 8, where the one or more instructions to determine the service comprise:

one or more instructions that, when executed by the processor, cause the processor to:
determine a network technology associated with the first roaming network; and
determine the service based on the network attribute and the network technology.

14. The non-transitory computer-readable medium of claim 8, where the one or more instructions to send the request for the service comprise:

one or more instructions that, when executed by the processor, cause the processor to:
determine a home network service to be provided by a home network via the first roaming network; and
send information identifying the home network service based on determining the home network service to be provided by the home network via the first roaming network.

15. A method comprising:

receiving, by a user device, roaming policy information, the roaming policy information including:
first information regarding a first policy for a first roaming network, and
second information regarding a second policy for a second roaming network;
storing, by the user device, based on the first information regarding the first policy, and in a first network identifier field of a data structure, a first network identifier that identifies the first roaming network;
storing, by the user device, based on the first information regarding the first policy, and in a first network technology field of the data structure, information identifying one or more first network technologies supported by the first roaming network;
storing, by the user device, based on the first information regarding the first policy, and in a first service field of the data structure, information identifying one or more first services available to the user device via the first roaming network;
storing, by the user device, based on the second information regarding the second policy, and in a second network identifier field of the data structure, a second network identifier that identifies the second roaming network;
storing, by the user device, based on the second information regarding the second policy, and in a second network technology field of the data structure, information identifying one or more second network technologies supported by the second roaming network;
storing, by the user device, based on the second information regarding the second policy, and in a second service field of the data structure, information identifying one or more second services available to the user device via the second roaming network;
determining, by the user device, that the user device is to connect to the first roaming network;
identifying, by the user device, a service, of the one or more first services, to be requested from the first roaming network based on a network technology of the one or more first network technologies; and
transmitting, by the user device, information identifying the first service requested from the first roaming network based on determining that the user device is to connect to the first roaming network.

16. The method of claim 15, where receiving the roaming policy information further comprises:

receiving the roaming policy information via a home network associated with the user device.

17. The method of claim 15, where the first information of the roaming policy information further comprises a network attribute associated with the first roaming network.

18. The method of claim 15, further comprising:

determining information associated with a roaming agreement,
the roaming agreement being an agreement associated with the first roaming network and a home network associated with the user device, receiving the roaming policy information comprising:
    receiving the roaming policy information based on determining the information associated with the roaming agreement.

19. The method of claim 15, where identifying the service comprises:
    determining a network attribute associated with the first roaming network; and
    identifying the service based on the network attribute and the network technology.

20. The method of claim 15, where transmitting the information identifying the service further comprises:
    determining a home network service to be provided by a home network via the first roaming network; and
    transmitting information identifying the home network service based on determining the home network service to be provided by the home network via the first roaming network.

* * * * *